United States Patent [19]

Adams, Jr.

[11] 3,719,784

[45] March 6, 1973

[54] ATTENDANT TO TRUNK COUPLER

[75] Inventor: John A. Adams, Jr., Fairport, N.Y.

[73] Assignee: Stromberg-Carlson Corporation, Rochester, N.Y.

[22] Filed: Dec. 23, 1970

[21] Appl. No.: 100,890

[52] U.S. Cl. ....................179/27 CA

[51] Int. Cl. ....................H04m 3/00, H04m 5/08

[58] Field of Search ....................179/27 CA, 27 FF

[56] References Cited

UNITED STATES PATENTS

| | | | |
|---|---|---|---|
| 3,377,434 | 4/1968 | Banks et al | 179/27 CA |
| 3,384,717 | 5/1968 | Coston | 179/27 CA |

*Primary Examiner*—William C. Cooper

*Attorney*—Craig, Antonelli, Stewart & Hill

[57] ABSTRACT

An attendant to trunk coupler includes a plurality of switching circuits connected to the attendant's turret, the register associated with the turret and a plurality of trunks. Each switching circuit includes a four layer diode which provides exclusive access by preventing a conductive path between the attendant's register and a truck through transmission or control logic leads. Break down of the diode provides a low impedance path to enable only the attendant connected with that particular switching circuit to be connected with a trucnk.

12 Claims, 2 Drawing Figures

Figure 1:
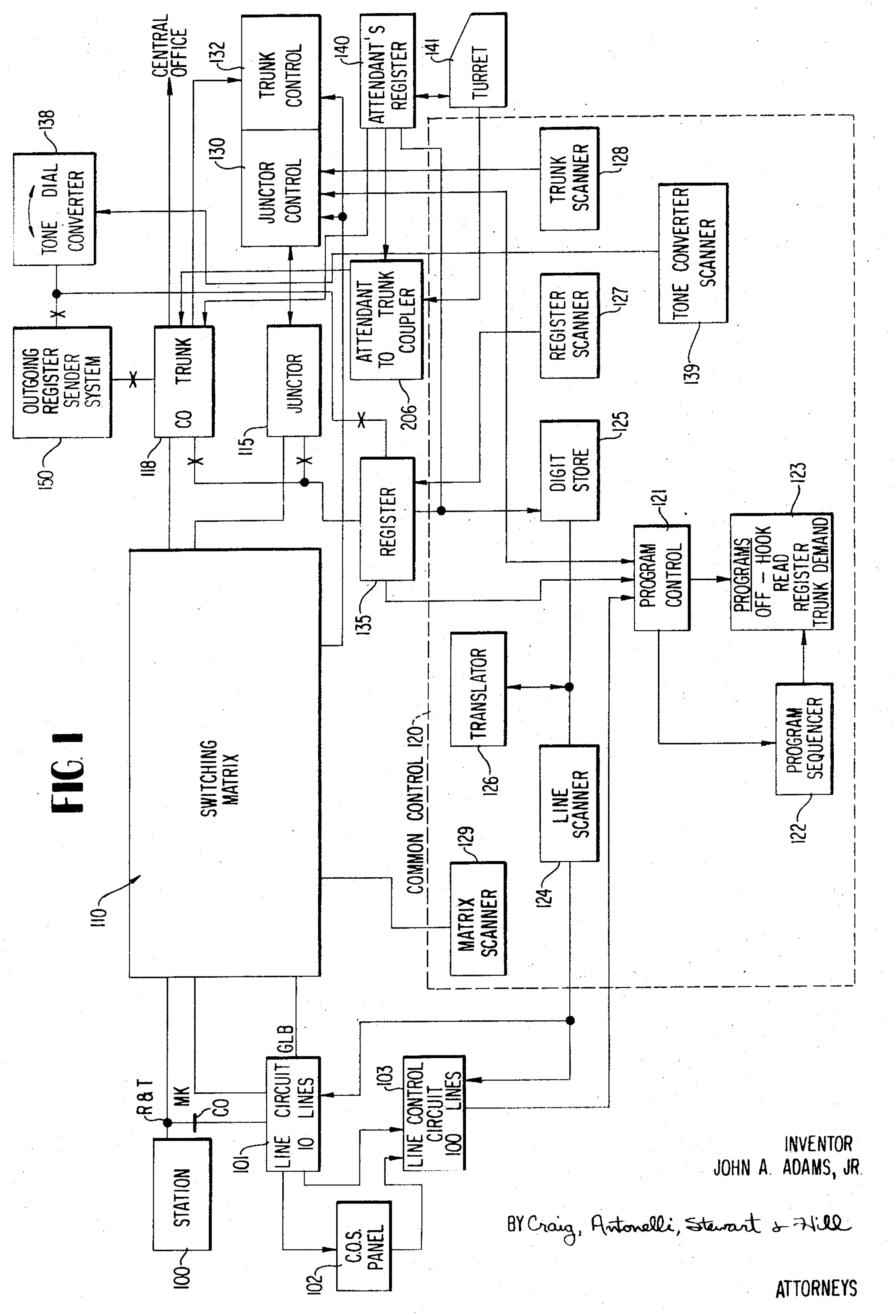

INVENTOR
JOHN A. ADAMS, JR.
BY Craig, Antonelli, Stewart & Hill
ATTORNEYS

INVENTOR
JOHN A. ADAMS, JR.

BY Craig, Antonelli, Stewart & Hill
ATTORNEYS

ATTENDANT TO TRUNK COUPLER

The present invention relates in general to telephone systems and more particularly to an attendant-to-trunk coupler for use with a PBX telephone system.

In a telephone system where a plurality of trunks are connected to and accessed by multiple attendants, there exists the possibility that several attendants may connect themselves to the same trunk at the same time, resulting in system interference. In attempts to overcome this problem, mechanical systems have been developed in which a key is depressed by an attendant to connect her with a particular trunk. Each of the keys is mechanically arranged, whereby pressing one key will prevent any other key from being depressed while the one key is held down. Also, it is mechanically impossible to depress more than one key at a time, so that an attendant may be connected only with a single trunk and only when a single key is depressed. However, if separate attendants have separate sets of mechanical switchboards, each attendant might connect himself with the same trunk even when using such a preventive mechanical system.

To overcome this problem, the present invention provides an electronic attendant-to-trunk coupling arrangement whereby one of several attendants may be connected to a selected trunk, while simultaneously preventing other attendants from being connected to that selected trunk. Each of the plurality of attendants has access to a multiplicity of trunks typically arranged in groups and can connect herself to one of the trunks either by dialing an access code, which identifies a particular trunk group desired for an outgoing call, or she may merely use a key-lamp switch on her turret to connect herself with a trunk on which an incoming call is directed. As long as an attendant remains connected to a trunk, the coupler of the present invention prevents any other attendant from connecting herself to that particular trunk and, also, prevents the connected attendant from connecting herself with any other trunk.

Each attendant gains access to the multiplicity of trunks through her turret and its associated register. Both the transmission and control logic leads are switchably connected between the attendant's facilities and the multiplicity of trunks. On the attendant's turret, each trunk is represented by an individual key-lamp combination. When the attendant momentarily presses a key associated with a selected trunk, the attendant is connected to that trunk by way of the coupler of the present invention and remains connected until another trunk key is pressed or until the "attendant release" key is pressed. Because of the operation of the coupler of the present invention, it is impossible for other attendants to connect themselves with the selected trunk simultaneously with the one attendant.

Accordingly, it is an object of the present invention to provide a telephone system having a plurality of attendants and a multiplicity of trunks including an attendant to trunk coupler whereby an attendant can connect herself to one trunk at a time.

It is a further object of the present invention to provide an attendant to trunk coupler whereby only one attendant can be connected to a given trunk at a given time.

It is an additional object of the present invention to provide a telephone system employing an attendant trunk coupler whereby a selected attendant and a particular trunk can be automatically connected together by the systems common control.

It is still another object of the present invention to provide an attendant to trunk coupler which provides high switching speed and segregated voltage levels, so as to prevent simultaneous access of a trunk by more than one attendant.

In accordance with one feature of the present invention, an attendant to trunk coupler is provided for a PBX telephone system which enables one of a plurality of attendants to gain access to one of a multiplicity of trunks while simultaneously preventing any other attendant from gaining access to that trunk. The number of trunks within the system and the number of attendants associated therewith is not limited and may be readily expanded within the scope of the present invention.

Each coupler includes a plurality of switching circuits which are connected to the attendant's turret, the register associated with the turret, and a multiplicity of trunks. Exclusive access is made possible by the use of a four layer diode associated with each switching circuit. Until the four layer diode breaks down by the application of the appropriate voltage thereacross, the diode acts as a high impedance preventing a conductive path between the attendant's register and any trunk through either the transmission lines or the control logic leads. Once the four layer diode within the switching circuit breaks down, however, a low impedance is provided whereby the attendant which is connected with that particular switching circuit within the coupler may be connected with a trunk exclusively. The register associated with that attendant's turret will then present a blocking voltage to the coupler to prevent the remaining switching circuits therein from applying a break down voltage to the other four layer diodes in each switching circuit. Until the attendant depresses a release key or depresses another key on her turret, she will remain connected to the trunk via the low impedance path provided by the four layer diode.

If an attendant wishes to gain access to a trunk for an outgoing call, she merely dials an access code associated with the trunk group to which she wishes to be connected and the common control will then select an idle trunk within that group. Upon selecting an idle trunk, the common control will deliver, through the trunk, a signal to the coupler causing breakdown of the four layer diode in the switching circuit of the coupler associated with that attendant, whereby transmission and control logic leads located between the attendant's register and that trunk will be connected.

Figure 2:
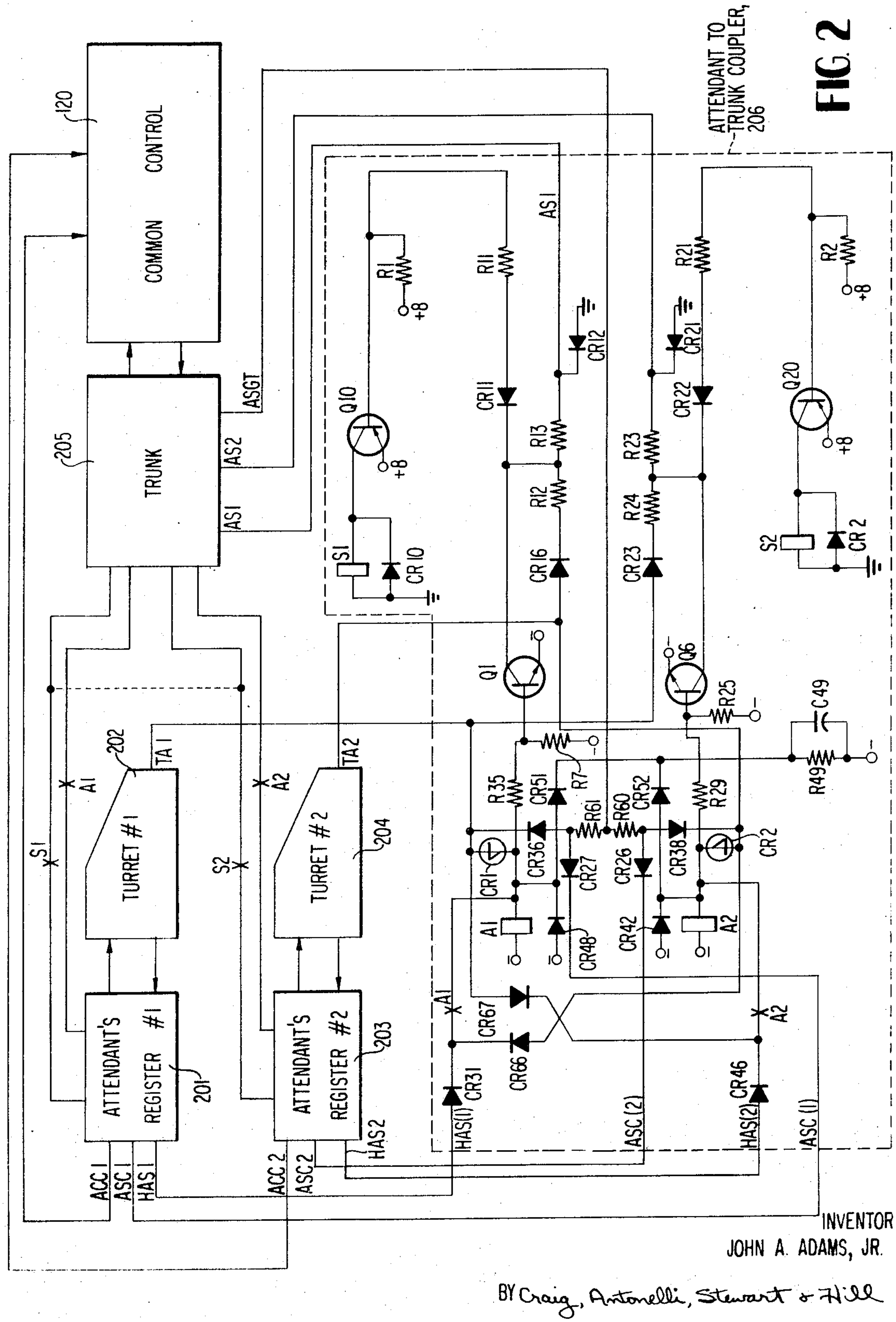

These and other features, objects and advantages of the present invention will become more apparent from the following detailed description thereof, when taken in conjunction with the accompanying drawings, which illustrate one embodiment of the present invention and wherein:

FIG. 1 is a schematic block diagram of a PABX telephone system including the attendant to trunk coupler of the present invention; and FIG. 2 is a schematic circuit diagram of the attendant to trunk coupler and its association with a portion of the circuitry of FIG. 1.

The principles of the present invention are described in detail below in conjunction with an exemplary PBX telephone system of the common control type. Since the present invention is not restricted to use in association with this or any other particular telephone system, it should be understood that the specific telephone system described herein is presented only for purposes of facilitating an understanding of the present invention. Accordingly, only those detailed features of the disclosed common control system which are important to the operation of the present invention have been described in detail.

GENERAL SYSTEM DESCRIPTION

FIG. 1 illustrates an over-all block diagram of a common control PBX system capable of connecting one station to another station or to a central office via a trunk circuit under control of the common control circuit. The system provides a plurality of stations 100 (of which only a single station is illustrated in FIG. 1 for purposes of simplicity) with each group of 10 stations 100 being serviced by a line circuit 101 associated with a particular input of the switching matrix 110. The switching matrix 110 is a typical matrix network formed of three stages of reed relay switches providing a plurality of paths between a given input connected to one of the plurality of stations 100 and a given output, connectable to a junctor or a central office trunk 118. All of the switching functions of the system are controlled by the common control circuit 120 which performs the functions for an off-hook program, the read register program and a trunk demand program. One or more junctor controls 130 and trunk controls 132, along with a plurality of registers 135, are also provided for purposes of effecting connection of a particular station requiring service to the common control equipment, so that the operations necessary for the establishment of a communication connection with the PBX or outside thereof to the central office may be performed.

A class of service panel 102 is provided for each group of one hundred lines and indicates for the respective stations served by the line circuit, special classes of service which are available for the stations and particular equipment which may be available or used thereby, such as tone-dial equipment as opposed to rotary dial.

The common control 120 is divided into several separate functional circuits which serve to control the program of operations carried out to perform the switching process, including the path checking and selection required for connection of a station requesting service to a register or central office trunk. A line control circuit 103 accommodating ten line circuits 101 serves as an interface between the common control 120 and the individual line circuits 101. The common control 120 typically includes a program control 121 which selects the program to be run in order to satisfy a request for service, a program sequencer 122 and a program 123, which implement the program selected by the program control circuit 121. The program control 121 program sequencer 122 and program circuit 123 may typically take the form of a wired logic or other programmed system of the type well known in the art. The various control signals emminating from this control area of the common control 120 have not been illustrated in detail in FIG. 1 but are shown in the subsequent figures where necessary for an understanding of the operation of the present invention.

The common control 120 includes a line scanner 124, which determines the line demanding service on an originating call and identifies and acts as a line marker when terminating a call. A translator 126 is also provided and serves the functions normally associated with a line scanner 124 and the register 135, which is external to the common control, for receiving the digits placed in the register. A register scanner 127 examines the status of the registers and register-senders, in order to determine whether an idle register or an outgoing register sender is available for use in connection with a calling station or defined the register demanding service, in order to complete a call. A trunk scanner 128 and matrix scanner 129 are associated with the path selecting and checking operation performed in connection with the switching matrix 110, the trunk scanner 128 serving the junctors 115 and the central office trunks 118 through the junctor control circuit 130 or trunk control 132, to determine those which may be available to a calling station through the switching matrix 110. The matrix scanner 129 serves to scan the links in the switching matrix 110 in the process of establishing a path from a given calling station through the switching matrix in accordance with the system disclosed in copending application Ser. No. 37,772, filed May 15, 1970 in the name of Ernest O. Lee, Jr. and assigned to the same assignee as the present application. This copending application also includes a detailed description and illustration of the switching matrix 110 and the various elements including a junctor control 130 and trunk control 132 along with other elements required for the path finding operation. In order to provide attendant service in the system, an attendant's register 140 and turret are connected to the central office trunks 118 and registers 135 to provide service for the incoming and outgoing calls. Also associated with the attendant's register and turret is the attendant to trunk coupler of the present invention.

The attendant to trunk coupler circuit 206 is associated with the attendant's register 140, turret 141 and trunk circuitry 118 which, in turn, is connected to the outgoing register sender system 150. The operation of the attendant-to-trunk coupler will be described in detail in connection with FIG. 2.

Typical operation of the system shown in FIG. 1 is initiated by a subscriber at a given station 100 lifting the handset of his telephone, which results in the closing of a direct current loop to the tip T and ring R leads of the line, thereby signaling the associated line circuit 101 of a demand for service. The demand is placed through the associated line control circuit 103 to the common control 120 for an offhook program, and the common control causes the scanner 124 to scan over the lines to identify the particular line requesting service. Upon identifying the line requesting service, the class of service check is made through the COS panel 102 to determine whether the line has a rotary line class of service or a multi-frequency class of service, information which is necessary to determine whether the tone dial converter 138 is necessary for the establishment of a call.

The common control 120 causes the line circuit 101 to place a negative mark on its mark lead, which is connected to an input of the switching matrix 110. The common control 120 then actuates the matrix scanner 129 initiating the path checking and selecting operations, which will select a single path through the switching matrix 110 from the station 100 requesting service. The common control 120 also causes the trunk scanner 128 to scan over the junctors 115 through a junctor control 130 for an idle junctor, and the register scanner 127 to select an idle register. The cross points of the selected matrix path are operated at this time, connecting the calling line through the junctor through the selected register. Dial tone is returned to the calling line from the register through the switching matrix and, at this time, the common control releases and is available to handle additional requests for service. After receiving dial tone, the subscriber dials one or more digits which are received and stored in the register 135. The common control analyzes the digits dialed as they are received to determine whether the call to be established is a local call, an outgoing trunk call or a special request for service.

For an outgoing trunk call, the attendant may key the access code assigned to a desired trunk group by way of turret 141. The associated register 140 will then signal the common control 120. When the common control is attached to the register, the register transmits signals to the control informing the common control that a connection with an outgoing trunk is desired. The common control will then search for an idle trunk in the group desired by the attendant and will connect to the first idle trunk found in the proper group. The common control will then signal the attendant-to-trunk coupler 206, by way of the trunk, that a connection is to be made with the attendant's register. The appropriate relays within the coupler are then activated so as to permit connection of control logic and transmission leads between the attendant's register and the desired trunk. In this manner, the attendant is automatically connected to the appropriate trunk circuit.

For an incoming call, the key lamp, associated with the trunk on which an incoming call is directed, will be illuminated on the attendant's turret. The first attendant who depresses the key on her turret which is associated with that trunk will gain access through the coupler 206 and her register 140 to the trunk. The coupler 206 automatically prevents any other attendant, who may depress the key-lamp on her turret associated with that particular trunk from gaining access to the trunk. The connected attendant remains connected until another trunk key on her turret 141 is depressed or until she depresses the "attendant release" key on her turret. Specific details of the attendant-to-trunk coupler of the present invention are shown in FIG. 2 and will be described in more detail hereinafter.

ATTENDANT-TO-TRUNK COUPLER

The attendant-to-trunk coupler of the present invention is shown in detail within the broken lines 206 in FIG. 2. Also shown and connected thereto are attendant's registers 201 and 203, attendant's turrets 202 and 204, trunk circuit 205 and the common control 120. These latter elements are not shown in detail and only those connections which are necessary for an understanding of the present invention are illustrated. Furthermore, while facilities for only two attendant's have been shown, it is to be understood that the number of attendants which may be connected to the multiplicity of trunks is not by any means limited. Also, while only a single trunk 205 has been shown, it is to be understood that this trunk may be connected with more than the two attendant's illustrated and that trunk 205 represents only one of a plurality of trunks connected in parallel with the trunk coupler and the attendant's facilities as well as the common control.

In FIG. 2, the following lead designations are employed:

| Lead Designations | Description of Designation | Primary Function of Lead |
|---|---|---|
| TA1, TA2 | trunk association key | resistance ground when trunk key is pressed |
| HAS1,HAS2 | hold "A" and "S" | resistance ground connected by attendant's register to hold the "A" and "S" relays |
| ASGT | "A" and "S" control | operate path for "A" relays common control access |
| ASC1, ASC2 | "A" and "S" control | negative potential from attendant's register steers ASGT signal to operate appropriate "A" relays |
| ACC1 and ACC2 | attendant's register to common control | signal from attendant's register to common control for outgoing trunk call |

| Relay Designation | Description of Designation | Primary Function of Relay |
|---|---|---|
| A1 | first attendant associated | connects transmission leads from first attendant to specification |
| A2 | second attendant associated | connects transmission leads from second attendant to specific trunk |
| S1 | slave to A1 | extends logic signals from first attendant to specific trunk |
| S2 | slave to A2 | extends logic signals from second attendant to specific trunk |

In order to answer an incoming trunk call, the attendant momentarily presses a combination key/lamp associated with her trunk. Assuming that attendant No. 1 answers a call for a particular trunk, resistance ground will be extended through the key depressed, to lead TA1, to four layer diode CR1. Four layer diode CR1 breaks down (conducts) if the potential across it is 40 volts or more and it continues to conduct as long as a minimum current flows through it (approximately 15 m.a.). Upon breaking down, four layer diode CR1 provides a low impedance path therethrough so that relay coil A1 is energized, which has the effect of maintaining current flow through the four layer diode CR1.

When attendant No. 1 releases the trunk key which she has momentarily depressed on turret 202, her associated register 201 will extend resistance ground by way of lead HAS1. Ground is no longer provided by lead TA1, since the trunk key has been released. Because four layer diode CR1 has been supplied with the necessary 40 volt break down voltage, the four layer diode CR2, which is associated with the second attendant, cannot break down in parallel with CR1, which is already conducting.

Resistance ground which is provided on lead HAS1 is provided through diode CR31, the closed contacts of energized relay A1 and resistor R35 to transistor Q1. A sufficient potential drop now exists across resistor R7 so as to cause transistor Q1 to conduct.

Transistor Q1 provides logic ground to trunk 205 by way of diode CR12, which has been rendered conductive by the drop across resistor R13, on lead AS1 to trunk 205. The trunk circuit 205, on which the incoming call is located, is thus signaled that attendant No. 1 is associated therewith. At the same time, the turning on of transistor Q1 provides a negative signal through diode CR11 and resistor R11 to transistor Q10. A voltage drop then exists across resistor R1 to turn on transistor Q10 and energize relay S1. Since both relays S1 and A1 are energized, the contacts associated therewith, disposed within the paths between the attendant'register No. 1 and the trunk 205, will be closed to enable transmission and logic control leads to be extended from the attendant's register 201 to trunk circuit 205. As a result, attendant No. 1 is now connected to the trunk. To ensure exclusive connection, resistor R12 and diode CR16 are connected in series with the collector of transistor Q1 and the four layer diode CR2 associated with the trunk coupler connected to turret 204. The negative potential applied to diode CR2 prevents diode CR2 from breaking down so that attendant No. 2 cannot gain access to the trunk.

When attendant No. 1 releases herself from trunk 205, by pressing another trunk key on turret 202 or the "attendant release" key thereon, ground is removed from lead HAS 1 by way of register 201. Relay coil A1 will, thus, be deenergized and transistor Q1 will be turned off. With relay coil A1 deenergized, the minimum amount of current flow which is required to maintain four layer diode CR1 conductive will be cut off. With transistor Q1 non conductive, relay coil S1, in addition to relay coil A1, will be deenergized so that the contacts associated with both relays will be open so as to prevent a connection between the attendant's register 201 and the trunk circuit 205.

Attendant No. 2 may now gain exclusive access to trunk circuit 205 through the same procedure by momentarily depressing the key/lamp associated with her turret. Resistance ground will be extended by way of lead TA2 to the four layer diode CR2 so as to cause breakdown of the latter. Relay coil A2 will be energized in the same manner as coil A1, whereby transistors Q6 and Q20 will conduct so as to energize relay coil S2. Ground will also be provided on lead HAS 2 from the attendant's register to maintain relay coil A2 conductive. In this manner, attendant's register 203 will be extended to trunk 205 since the contacts for relays A2 and S2 are closed. Attendant No. 2, of course, releases in the same manner as attendant No. 1.

In order to originate an outgoing trunk call, the attendant will key the access code assigned to a desired trunk group. Again, assuming that attendant No. 1 desires to be associated with a trunk in a group in which trunk 205 is associated, register 201 will signal the common control 120 on lead ACC1. The common control, upon being attached to register 201, will then search for an idle trunk in the desired group. Assuming that trunk 205 is idle and is in the group which is selected by common control 120, upon its seizure by the common control, ground will be extended through the trunk on lead ASGT to the trunk coupler 206.

Normally, each of the attendant's registers maintains negative potential on leads ASC. However, since attendant No. 1 desires to be associated with a trunk, lead ASC 1 removes the negative potential applied to diode CR 27 at the junction of diode CR 36 and resistor R61. Ground on lead ASGT which is connected to the junction point of resistors R61 and R60 will be passed through diode CR36 to four layer diode CR1. In the same manner that ground was connected by way of lead TA1 to the four layer diode CR1, relay A1 will be energized so that attendant No. 1 will be connected to the trunk 205. Relay A1 will lock itself by way of diode CR31 to lead HAS1 so as to permit the operation of relay S1 in the manner as previously described. The attendant is thus automatically connected to the appropriate trunk circuit for originating an outgoing trunk call through the trunk circuit. Since attendant's register 203 is providing a negative potential on lead ASC2 through diode CR26, negative potential is applied to the junction point of doides CR26, resistor R60 and diode CR38 to prevent the simultaneous breakdown of CR2 with diode CR1, when ground is extended over lead ASGT. Upon the termination of the call, the trunk circuit will be released from the attendant's register in the same manner as previously described.

As was originally discussed, the number of attendants and number of trunks is not limited and may be varied within practical limits. The only requirement is the association of a switching circuit, such as the switching circuits containing four layer diodes CR1 and CR2, with each attendant in the manner explained above and depicted in FIG. 2.

What is claimed is:

1. In a common control telephone system including connections with groups of trunk circuits, a common control circuit and a plurality of attendants facilities, each facility including a turret, having a plurality of individual trunk keys associated therewith, and its associated register, and selectively connectable transmission and logic control leads provided between each register and each one of a plurality of trunks which are capable of being accessed thereby and connected thereto, an attendant-to-trunk coupler for establishing exclusive connections between one attendant and one trunk comprising:

first means including a semiconductor breakdown diode circuit responsive to a signal generated as a result of the depression of one of said keys on one of said attendant's turrets for connecting said transmission and logic control leads between the register associated with said one of said attendant's turrets and the trunk associated with said key so as to establish a connection between one attendant's facility and a single trunk; and second means responsive to the connection of said one attendant's facility with said single trunk for preventing the connection of any other attendant's facility with said trunk, whereby only one attendant may be connected with one trunk at a time.

2. An attendant-to-trunk coupler according to claim 1, wherein said first means includes a first switching circuit responsive to a trunk association signal from said turret delivered upon the depression of a trunk key for directly enabling the connection of said transmission leads to said trunk.

3. In a common control telephone system including connections with groups of trunk circuits, a common control circuit and a plurality of attendants facilities, each facility including a turret, having a plurality of individual trunk keys associated therewith, and its associated register, and selectively connectable transmission and logic control leads provided between each register and each one of a plurality of trunks which are capable of being accessed thereby and connected thereto, an attendant-to-trunk coupler for establishing exclusive connections between one attendant and one trunk comprising:

first means responsive to the depression of one of said keys on one of said attendant's turrets for connecting said transmission and logic control leads between the register associated with said one of said attendant's turrets and the trunk associated with said key so as to establish a connection between one attendant's facility and a single trunk; and second means responsive to the connection of said one attendant's facility with said single trunk for preventing the connection of any other attendant's facility with said trunk, whereby only one attendant may be connected with one trunk at a time, wherein said first means includes a first switching circuit responsive to a trunk association signal from said turret delivered upon the depression of a trunk key for directly enabling the connection of said transmission leads to said trunk, and wherein said first means further includes a second switching circuit responsive to the activation of said first switching circuit and a holding signal from the register associated with said one turret for directly enabling the connection of said logic control leads to said trunk.

4. An attendant-to-trunk coupler according to claim 3, wherein said first switching circuit includes a four-layer diode and a first relay switch connected between said turret and a source of voltage sufficient to cause break down of said four layer diode, whereby, in response to said trunk association signal being delivered from said turret, said four layer diode will conduct so that said first relay switch will be energized to enable said transmission leads connections.

5. An attendant-to-trunk coupler according to claim 4, wherein said first switching circuit further includes relay contacts of said first relay switch connected between said attendant's register and said relay winding for holding said first relay switch closed in response to said holding signal and wherein said transmission leads include relay contacts of said first relay, so as to maintain said transmission lead connections.

6. An attendant-to-trunk coupler according to claim 5, further including a first transistor circuit responsive to said holding signal for delivering an enabling signal to said second switching circuit.

7. An attendant-to-trunk coupler according to claim 6, wherein said second switching circuit comprises a second relay switch connected to the output of said first transistor circuit, said second relay switch having its relay contacts connected in the path of said control logic leads from said attendant's register to said trunk, whereby said control logic leads will be connected between said register and said trunk as long as said second relay switch is energized.

8. An attendant-to-trunk coupler according to claim 6, wherein said first transistor circuit comprises a first transistor having its input connected to the relay contacts of said first relay switch, so as to receive said holding signal, and its output connected to a first diode switch for providing resistance ground to said trunk circuit so as to indicate to said trunk circuit that an attendant's facility is associated therewith.

9. An attendant-to-trunk coupler according to claim 5, wherein said second means includes a second diode switch connected between said first transistor circuit and a third switching circuit, identical to said first switching circuit but being associated with another attendant's facility for preventing the activation of said third switching circuit in response to a trunk association signal from said other attendant's facility as long as said one attendant's facility has energized the first switching circuit in the coupler associated therewith.

10. An attendant-to-trunk coupler according to claim 9, wherein said first transistor circuit comprises a first transistor, having its output connected to the relay contact of said first relay switch, so as to receive said holding signal and its output connected to a first diode switch for providing resistance ground to said trunk circuit, so as to indicate to said trunk circuit that an attendant's facility is associated therewith.

11. An attendant-to-trunk coupler according to claim 4, wherein said second means includes a voltage divider connected between the first switching circuit of each attendant-to-trunk coupler, the number of said switching circuits being equal to the number of attendant's facilities having access to the same plurality of trunks by way of the same trunk coupler, the common junction of each portion of said voltage divider being selectively connected to said common control circuit through each respective trunk circuit in said plurality of trunks.

12. An attendant-to-trunk coupler according to claim 11, wherein each end of said voltage divider, which is connected to each first switching circuit, is connected to each respective attendant's register, for receiving a first switching circuit blocking signal from each attendant's register except the connected attendant's register, when the first switching circuit associated with any attendant's facility in said coupler is energized.

* * * * *

UNITED STATES PATENT OFFICE
CERTIFICATE OF CORRECTION

PATENT NO. : 3,719,784

DATED : March 6, 1973

INVENTOR(S) : John A. Adams, Jr.

It is certified that error appears in the above-identified patent and that said Letters Patent are hereby corrected as shown below:

| | |
|---|---|
| Abstract, last line | "trucnk" should read ---trunk---. |
| Col. 1, line 21 | "himself" should read ---herself---. |
| Col. 6, line 21 | After "A" insert ---and "S"---. |
| line 38 | "specification" should read ---specific trunks---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*